Patented Jan. 12, 1926.

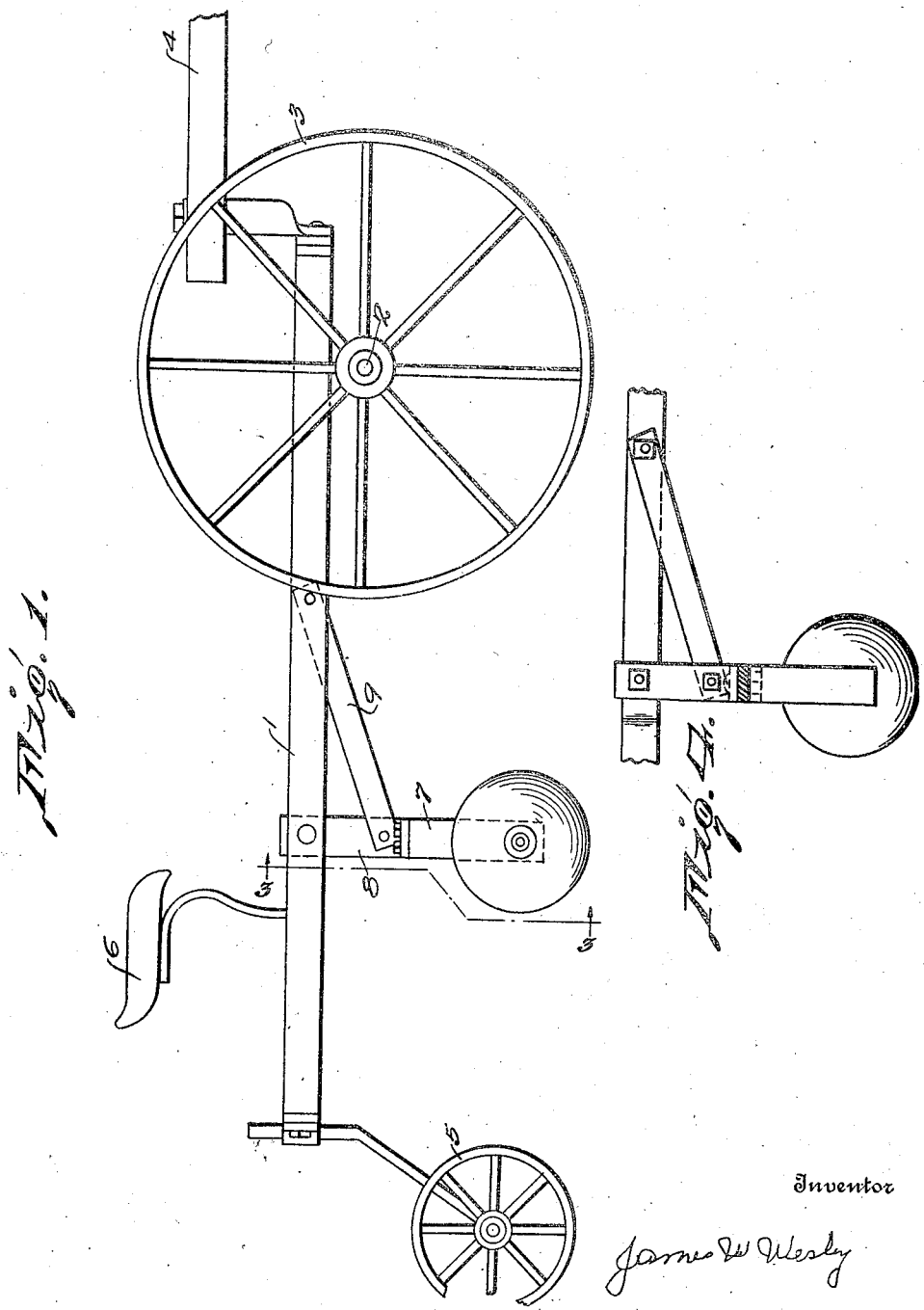

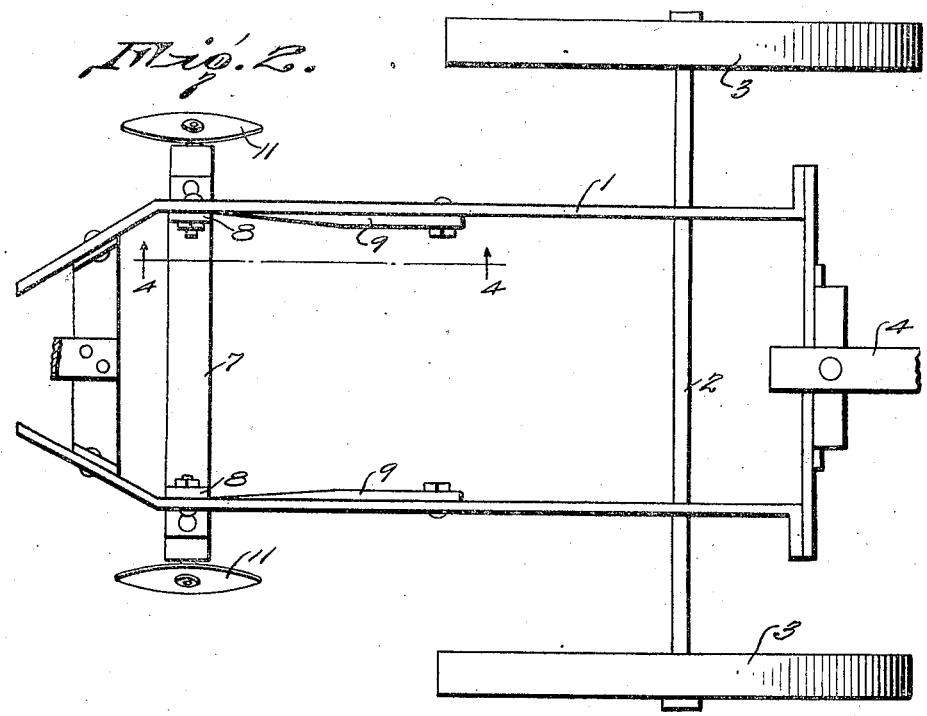

1,569,598

UNITED STATES PATENT OFFICE.

JAMES W. WESLEY, OF HAPPY, TEXAS.

ATTACHMENT FOR LISTERS.

Application filed May 22, 1923. Serial No. 640,773.

*To all whom it may concern:*

Be it known that I, JAMES W. WESLEY, a citizen of the United States, residing at Happy, in the county of Swisher and State of Texas, have invented certain new and useful Improvements in an Attachment for Listers, of which the following is a specification.

This invention relates to harrow attachments for plows, the prime object of the invention being to provide a novel construction of harrow-frame adapted to be attached to a plow frame, whereby the harrow disks are positioned one on each side of the plow, so that the strip of weeds usually left on each side of a lister plow are cut and destroyed by the disks.

A further object of my invention is to provide a harrow attachment for plows which is simple in construction, durable, efficient for the purpose intended, and one that can be manufactured and installed on lister plows at a relatively low cost.

A still further object of my invention is to provide a harrow frame carrying disks adapted to be used in combination with a lister plow, thus saving the work of one man and one team.

These and like objects of the invention will be better understood as the description follows and as is specifically pointed out in the appended claim.

Referring to the accompanying drawings in detail, like characters will be used to designate like parts in the different views.

In the accompanying drawings which form a part of this specification,

Figure 1 is a side elevation of a lister plow having my improved harrow attachment applied thereto.

Figure 2 is a top plan view of same.

Figure 3 is a sectional view taken on line 3—3 of Figure 1.

Figure 4 is an enlarged fragmentary section taken on line 4—4 of Figure 2.

Referring to the accompanying drawings in detail, like characters will be used to designate like parts in the different views.

In the drawings, the numeral 1 designates a rectangular frame of what is commonly known as the frame of a lister plow, having an axle 2 supported therefrom on which is mounted wheels 3. The lister plow is drawn over the ground by a tongue 4 to which are attached draft animals. The rear end of the frame is supported by a guide wheel 5, and a seat 6 for the operator of the plow is supported in any suitable way on the frame 1.

An inverted U-shaped frame 7 is supported from the rear end of the frame 1 by a pair of L-shaped brackets 8, which are bolted to opposite sides of the frame 1 and U-shaped frame 7, as is clearly indicated in Figure 3.

In order to prevent the U-shaped frame from having any swinging movement, braces 9 are positioned on opposite sides of the frame 1, one end of each frame engaging the side rails of the frame 1, while the opposite end of each brace is secured to the L-shaped brackets 8.

Each end of the U-shaped frame 7 is bent outwardly as at 10 and a disk 11 is mounted for rotation on each outwardly bent portion. The plows (not shown) are supported from the frame 1, between the disks 11.

In view of the foregoing description of my invention, it is thought that any further explanation as to the construction, operation, and objects of same is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

A lister attachment comprising a U-shaped frame provided at its end with outstanding extremities, disks journaled upon the extremities and having their cutting edges disposed in planes which are anticlined with relation to each other, brackets mounted upon the intermediate portion of the frame at points spaced from the ends thereof and upwardly and forwardly inclined braces connected with the intermediate portions of the bracket.

In testimony whereof, I have affixed my signature.

JAMES W. WESLEY.